(12) United States Patent
Tanaka

(10) Patent No.: US 7,003,379 B2
(45) Date of Patent: Feb. 21, 2006

(54) LIMIT CYCLE AUTOTUNING METHOD AND HEAT/COOL CONTROL APPARATUS

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 158 days.

(21) Appl. No.: 10/759,983

(22) Filed: Jan. 16, 2004

(65) Prior Publication Data

US 2004/0148059 A1 Jul. 29, 2004

(30) Foreign Application Priority Data

Jan. 20, 2003 (JP) .............................. 2003-010915

(51) Int. Cl.
*G05B 13/00* (2006.01)
(52) U.S. Cl. ..................... 700/278; 710/37; 710/42; 710/52; 710/55; 710/68
(58) Field of Classification Search .................. 700/37, 700/42, 45, 46, 52, 55, 68, 72, 278, 282, 700/299; 702/99, 100; 706/906; 236/78 D; 165/254
See application file for complete search history.

(56) References Cited

U.S. PATENT DOCUMENTS 5,568,377 A * 10/1996 Seem et al. .................... 700/37
5,819,845 A * 10/1998 Ryu et al. .................... 165/254
6,266,580 B1 * 7/2001 Asahara et al. ............. 700/282
6,317,637 B1 * 11/2001 Limroth ........................ 700/42
6,783,080 B1 * 8/2004 Antoniou et al. .......... 236/78 D
6,895,287 B1 * 5/2005 Tanaka ........................ 700/37

FOREIGN PATENT DOCUMENTS

JP 05-289704 A 11/1993

\* cited by examiner

*Primary Examiner*—Albert W. Paladini
*Assistant Examiner*—Douglas S. Lee
(74) *Attorney, Agent, or Firm*—Blakely Sokoloff Taylor & Zafman

(57) ABSTRACT

In a limit cycle autotuning method, the first limit cycle of alternately outputting a heat-side manipulated variable set point and a cool-side manipulated variable set point is generated. The first control response corresponding to the first limit cycle is detected. The second limit cycle is generated by changing one of the heat-side manipulated variable set point and the cool-side manipulated variable set point on the basis of predetermined change instruction information for instructing which one of the heat-side manipulated variable set point and the cool-side manipulated variable set point is to be changed after the first limit cycle and a predetermined manipulated variable change ratio indicating the degree of the change. The second control response corresponding to the second limit cycle is detected. The control parameter for each of the heat mode and the cool mode is calculated on the basis of the detected first and second control responses. A heat/cool control apparatus is also disclosed.

8 Claims, 9 Drawing Sheets

LIMIT CYCLE AUTOTUNING METHOD AND HEAT/COOL CONTROL APPARATUS

BACKGROUND OF THE INVENTION

The present invention relates to a heat/cool control technique of performing temperature control by properly switching a heat mode of outputting a manipulated variable to a heating actuator and a cool mode of outputting a manipulated variable to a cooling actuator and, more particularly, to a limit cycle autotuning method and heat/cool control apparatus which adjust control parameters by generating a limit cycle with a constant manipulated variable amplitude.

A control technique called heat/cool control which selectively uses the heating capacity of a heater and the cooling capacity of a cooler is used for temperature control on air in the chamber of a thermostatic chamber unit, temperature control on a plastic material in an injection molding machine, and the like. The typical arrangement of an apparatus using this technique includes a mechanical unit which can heat and cool air and a fan which sends air with an arbitrary temperature at a proper airflow and sends heated or cooled air into a chamber/room as a control target.

FIG. 9 shows the arrangement of such a heat/cool control system. Reference numeral 21 denotes a thermostatic chamber; 22, a heater which heats air; 23, a cooler which cools air; 24, a temperature sensor which measures the temperature in the chamber; and 25, a heat/cool control apparatus. The heat/cool control apparatus 25 computes a manipulated variable MV on the basis of a set point (intra-chamber temperature set point) SP set by an operator and a controlled variable (intra-chamber-temperature) PV measured by the temperature sensor 24, and outputs the result to the heater 22 or cooler 23. The heating capacity of the heater 22 is increased/decreased by an SCR in accordance with the manipulated variable MV. The cooling capacity of the cooler 23 is increased/decreased by an inverter in accordance with the manipulated variable MV.

In brief, a control technique for the heat/cool control system in FIG. 9 is a temperature control technique which implements one PID control system and is of a heating/cooling switching type that operates the heater 22 in accordance with the manipulated variable MV (heat mode) if the manipulated variable MV is 0% or higher and operates the cooler 23 in accordance with the manipulated variable MV (cool mode) if the manipulated variable MV is lower than 0%, as shown in FIG. 10. As described above, the heat/cool control is a control technique which implements a single loop control system which is applied to an apparatus arrangement including heating and cooling actuators in one loop temperature control system and handles the heating and cooling actuators as a set. According to this technique, the manipulated variable MV is output to a heat-side operation end (heating actuator) in the heat mode, whereas the manipulated variable MV is output to a cool-side operation end (cooling actuator) in the cool mode.

In the above heat/cool control system, the PID parameters in the heat/cool control apparatus 25 must be switched to proper values in each of the heat mode and the cool-mode. In order to automatically obtain this proper value, an autotuning method has been proposed. This autotuning method is disclosed in, for example, Japanese Patent Laid-Open No. 5-289704. The autotuning method uses a limit cycle scheme. First of all, PID parameters on the heat mode side are obtained by the general limit cycle scheme of operating only the heater (in the first half of autotuning). The heater and cooler are then operated to generate a limit cycle (in the second half of autotuning). The proportional band of PID parameters on the cool mode side is calculated on the basis of a limit cycle amplitude in the first half of autotuning and a limit cycle amplitude in the second half of autotuning. Thereafter, autotuning is terminated.

Some apparatus using heat/cool control is designed such that forced heating by a heater is required to raise the temperature, and forced cooling by a cooler is required to lower the temperature. Some thermostatic test apparatus is used at room temperature (about 25° C.). In such an apparatus, autotuning is performed near room temperature. Assume that a limit cycle is to be generated by using only the heater at this time. In this case, after the intra-chamber temperature is raised, the temperature must be lowered while the apparatus is left standing at room temperature. As a consequence, a condition occurs in which the temperature hardly drops, i.e., a condition occurs in which it is impossible to generate a limit cycle. Likewise, assume that a limit cycle is to be generated by using only the cooler. In this case, after the intra-chamber temperature is lowered, the temperature must be raised while the apparatus is left standing at room temperature. As a consequence, a condition occurs in which the temperature hardly rises.

If a limit cycle cannot be generated by using only the heater or cooler, since it is difficult to generate a limit cycle by operating only the heater as in the above autotuning method, the conventional autotuning method cannot be used. Conventionally, as described above, in the heat/cool control system which cannot generate a limit cycle by using only the heater or cooler, it is impossible to obtain control parameters suitable for the heat mode and cool mode, respectively.

The above description is based on the premise that autotuning is performed near room temperature. This is, however, an example of autotuning. In some case, when a chamber is left standing after the intra-temperature is raised, the equilibrium point of temperature is settled at a temperature higher than room temperature due to a surrounding environment or the heat capacity of a furnace body. In such a case, in order to lower the temperature, forced cooling by a cooler is required. In contrast to this, in some case, when a chamber is left standing after the intra-temperature is lowered, the equilibrium point of temperature is settled at a low temperature. In such a case, in order to raise the temperature, forced hating by a heater is required. Therefore, when autotuning is to be performed at a temperature other than room temperature, the above problem can arise.

SUMMARY OF THE INVENTION

The present invention has been made to solve the above problem, and has as its object to provide a limit cycle autotuning method and heat/cool control apparatus which can obtain control parameters suitable for both the heat mode and the cool mode even if an autotuning function of heat/cool control cannot generate any limit cycle by using a heater or cooler alone.

In order to achieve the above object, according to the present invention, there is provided a limit cycle autotuning method of calculating a control parameter by alternately performing operation of outputting a predetermined heat-side manipulated variable set point to a heating actuator and operation of outputting a predetermined cool-side manipulated variable set point to a cooling actuator in a heat/cool control apparatus which performs temperature control by performing feedback control computation with respect to a deviation between a set point and a controlled variable on the basis of the control parameter, and properly switching a heat mode of outputting a manipulated variable to the heating actuator and a cool mode of outputting a manipulated variable to a cooling actuator, comprising the first limit cycle generation step of generating a first limit cycle of alternately outputting the heat-side manipulated variable set point and the cool-side manipulated variable set point, the first control response detection step of detecting a first control response corresponding to the first limit cycle, the second limit cycle generation step of generating a second limit cycle by changing one of the heat-side manipulated variable set point and the cool-side manipulated variable set point on the basis of predetermined change instruction information for instructing which one of the heat-side manipulated variable set point and the cool-side manipulated variable set point is to be changed after the first limit cycle and a predetermined manipulated variable change ratio indicating a degree of the change, the second control response detection step of detecting a second control response corresponding to the second limit cycle, and the control parameter calculation step of calculating the control parameter for each of the heat mode and the cool mode on the basis of the detected first and second control responses.

DESCRIPTION OF THE PREFERRED EMBODIMENTS

Figure 1:
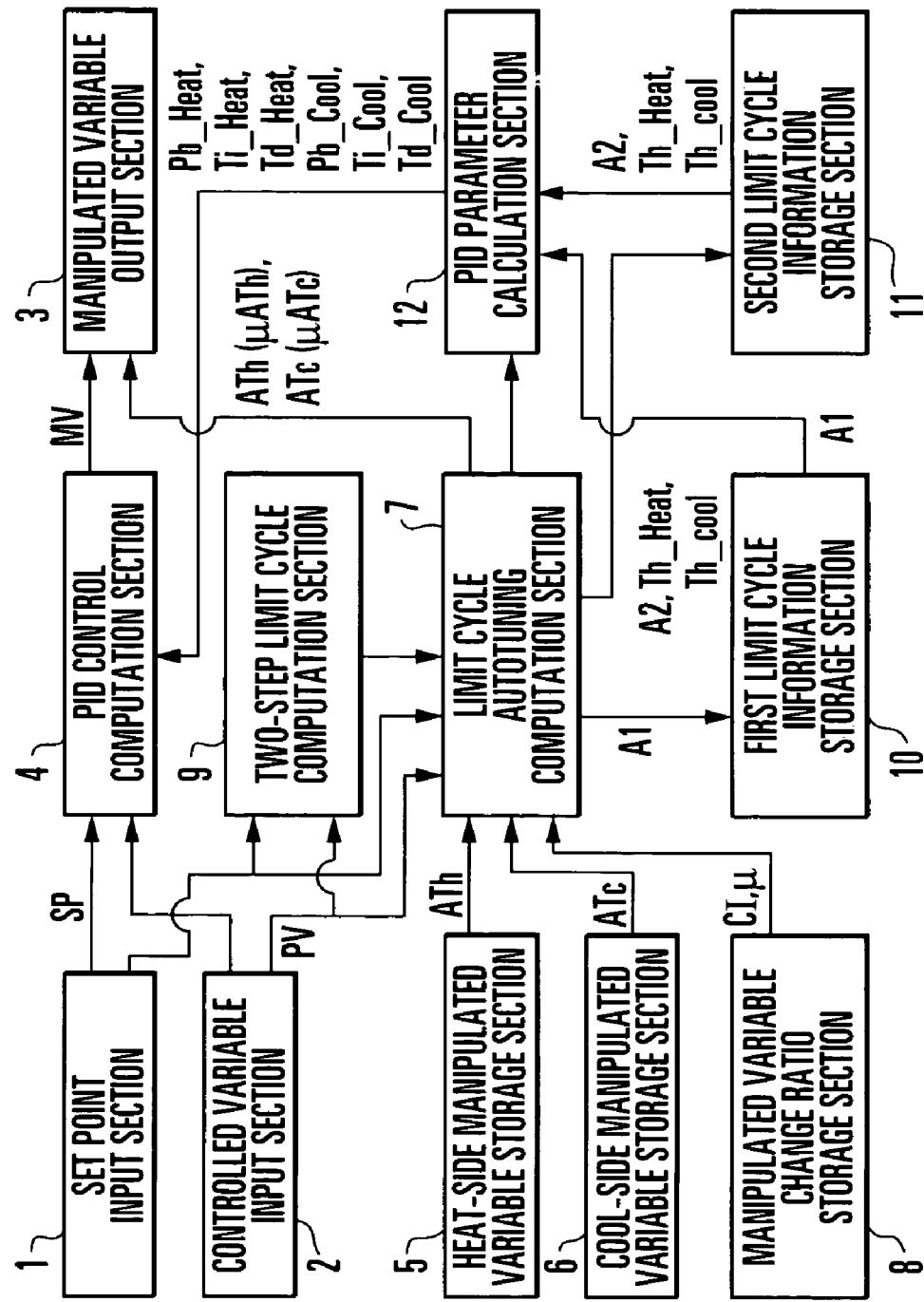
FIG. 1 is a block diagram showing the arrangement of a heat/cool control apparatus according to the first embodiment of the present invention.

The present invention will be described in detail next with reference to the accompanying drawings.

First Embodiment

The principle of limit cycle autotuning which automatically adjusts PID parameters according to a limit cycle with a constant manipulated variable amplitude will be described first. By continuing a manipulated variable output equivalent to ON-OFF control, a ascent/descent phenomenon (limit cycle) of a controlled variable PV corresponding to the characteristics of a control target can be obtained. In this case, a transfer function P of the control target is given by $$P = Kp \exp(-Lps)/(1+Tps) \tag{1}$$

where Kp is a process gain, Tp is a process time constant, Lp is a process dead time, and s is a Laplace operator.

Let AU be the upper limit value of a manipulated variable MV with a constant amplitude which is output at the time of execution of limit cycle autotuning, and AL be the lower limit value of the manipulated variable. If the controlled variable PV is equal to or lower than a set point SP, manipulated variable MV=AU is output to the control target. If the controlled variable PV is higher than the set point SP, manipulated variable MV=AL is output. If a limit cycle is generated when the controlled variable PV sets the time average of manipulated variable outputs in the limit cycle to almost. 0.5(AU+AL), a maximum change ratio dPVmax of the controlled variable PV becomes 0.5(Kp/Tp)(AU−AL).

A necessary time (manipulated variable switching elapsed time) Tha from the instant at which the manipulated variable MV is switched from AL to AU to the instant at which the controlled variable PV reaches the lowest descent point is equal to the process dead time Lp. Likewise, a necessary time (manipulated variable switching elapsed time) Thb from the instant at which the manipulated variable MV is switched from AU to AL and the instant at which the controlled variable PV reaches the highest ascent point is also equal to the process dead time Lp. When the time average of manipulated variable outputs in the limit cycle becomes 0.5(AU+AL), the necessary time from the lowest descent point of the controlled variable PV to the highest ascent point becomes almost 2Lp. According to the above description, an amplitude Ah of the controlled variable PV can be approximately given by $$Ah = 2LpdPV\max = (Kp/Tp)Lp(AU-AL) \tag{2}$$

Since an ordinary control target has a slight higher-order lag characteristic, the actual amplitude Ah is about 75% of the value given by equation (2) as indicated by the following equation:

$$Ah = 0.75(Kp/Tp)Lp(Au-AL) \tag{3}$$

In this case, as guidelines for setting PID parameters including a proportional band Pb, integral time Ti, and derivative time Td, the following are generally proposed:

$$Pb = \delta KpLp/(\alpha Tp) \tag{4}$$

$$Ti = \beta Lp \tag{5}$$

$$Td = \gamma Lp \tag{6}$$

In equations (4) to (6), the constants α, β, γ, and δ are, for example, 1.2, 2, 0.42, and 100, respectively.

When a limit cycle is generated, the amplitude Ah of the controlled variable PV and the manipulated variable switching elapsed times Tha and Thb (=Lp) are obtained. Letting Th be the average of Tha and Thb or an appropriate one of them and substituting them into equations (4) to (6), PID parameters are calculated as follows:

$$Pb = \delta KpLp/(\alpha Tp) = \delta Ah/\{\epsilon(AU-AL)\} \tag{7}$$

$$Ti = \beta Lp = \beta Th \tag{8}$$

$$Td = \gamma Lp = \gamma Th \tag{9}$$

In equation (7), the constant ε is 0.9.

The principle of a heat/cool control apparatus according to this embodiment will be described next. The value of the manipulated variable MV to be output to the heater during a limit cycle is set to a heat-side manipulated variable set point ATh (0<ATh≦100%), and the value of the manipulated variable MV to be output to the cooler is set to a cool-side manipulated variable set point ATc (−100<ATc≦0%). First of all, in the first limit cycle, if the controlled variable PV is equal to or lower than the set point SP, manipulated variable MV=ATh is output to the heater. If the controlled variable PV is higher than the set point SP, manipulated variable MV=ATc is output to the cooler. In the second limit cycle, the heat-side manipulated variable set point is changed to $\mu$ATh (0<$\mu$<1).

In this case, the amplitude of a response waveform (controlled variable PV) in the first limit cycle differs from that in the second limit cycle. This amplitude difference is related to the process gain (heat-side process gain) set when the heat-side manipulated variable set points ATh and $\mu$ATh are output and the process gain (cool-side process gain) set when the cool-side manipulated variable set point ATc is output.

The ratio between a heat-side process gain and a cool-side process gain is also the ratio between a proportional-band (heat-side proportional band) Pb_Heat suitable for the calculation of the manipulated variable MV to be output to the heater and a proportional band (cool-side proportional band) Pb_Cool suitable for the calculation of the manipulated variable MV to be output to the cooler. This ratio $\kappa$ is determined as follows:

$$Pb\_Heat:Pb\_Cool=\kappa:1-\kappa \quad (10)$$

According to the ratio $\kappa$, an amplitude A1 of the controlled variable PV in the first limit cycle and an amplitude A2 of the controlled variable PV in the second limit cycle are given by $$A1=\lambda\{\kappa ATh+(1-\kappa)ATc\} \quad (11)$$

$$A2=\lambda\{\mu\kappa ATh+(1-\kappa)ATc\} \quad (12)$$

In equations (11) and (12), $\lambda$ is a proportional coefficient.

If the proportional coefficients $\lambda$ are eliminated from equations (11) and (12), and the equations are combined with respect to the ratio $\kappa$, the following is obtained:

$$\kappa=\{ATc(A2-A1))\}/\{(ATc(A2-A1)+ATh(A2-\mu A1)\} \quad (13)$$

If a cool-side manipulated variable set point $\mu$ATc (0<$\mu$<1) is changed instead of the heat-side manipulated variable set point ATh in the second limit cycle, the following is obtained:

$$\kappa=\{ATc(\mu A1-A2)\}/\{ATc(A1-A2)+ATc(\mu A1-A2)\} \quad (14)$$

In this case, if an average proportional band Pb_Ave which is the average of the heat-side proportional band Pb_Heat and cool-side proportional band Pb_Cool is simply calculated on the basis of the amplitude A2 of the controlled variable PV which appears when the heat-side manipulated variable set point is changed to $\mu$ATh in the second limit cycle, the following is obtained:

$$Pb\_Ave=\delta A2/\{\epsilon(\mu ATh-ATc)\} \quad (15)$$

Likewise, if the average proportional band Pb_Ave is simply calculated on the basis of the amplitude A2 of the controlled variable PV which appears when the cool-side manipulated variable set point is changed to $\mu$ATh in the second limit cycle, the following is obtained:

$$Pb\_Ave=\delta A2/\{\epsilon(ATh-\mu ATc)\} \quad (16)$$

The relevant ratio of the heat-side process gain (heat-side proportional band) to the average proportional band Pb_Av is $\kappa$, and the relevant ratio of the cool-side process gain (cool-side proportional band) is 1−$\kappa$. When, therefore, the heat-side manipulated variable set point which has been ATh in the first limit cycle is changed to $\mu$ATh in the second limit cycle, or the cool-side manipulated variable set point which has been ATc in the first limit cycle is changed to $\mu$ATc in the second limit cycle, the heat-side proportional band Pb_Heat and cool-side proportional band Pb_Cool are obtained as follows:

$$Pb\_Heat=2\kappa Pb\_Ave \quad (17)$$

$$Pb\_Cool=2(1-\kappa)Pb\_Ave \quad (18)$$

Let Th_Heat be a manipulated variable switching elapsed time from the instant at which the manipulated variable MV is switched from the cool-side manipulated variable set point ATc (or $\mu$ATc) to the heat-side manipulated variable set point $\mu$ATh (or ATh) in the second limit cycle to the instant at which the controlled variable PV reaches the minimum value, and Th_Cool be a manipulated variable switching elapsed time from the instant at which the manipulated variable MV is switched from the heat-side manipulated variable set point $\mu$ATh (or ATh) to the cool-side manipulated variable set point ATc (ttATc) to the instant at which the controlled variable PV reaches the maximum value.

In general heat/cool control process apparatus design, there are no great differences in integral and derivative times as PID parameters between the heat mode and the cool mode. When, therefore, either the heat-side manipulated variable set point in the second limit cycle is to be changed to $\mu$ATh or the cool-side manipulated variable set point is changed to $\mu$ATc, an average integral time Ti_Ave and average derivative time Td_Ave are obtained from the average of the manipulated variable switching elapsed times Th_Heat and Th_Cool. The obtained average integral time Ti_Ave and average derivative time Td_Ave may be used as PID parameters on the heat mode side and cool mode side, respectively.

That is, the average integral time Ti_Ave and average derivative time Td_Ave can be calculated as follows by applying the manipulated variable switching elapsed times Th_Heat and Th_Cool to equations (8) and (9):

$$Ti\_Ave=\beta(Th\_Heat+Th\_Cool)/2 \quad (19)$$

$$Ti\_Ave=\gamma(Th\_Heat+Th\_Cool)/2 \quad (20)$$

As an integral time (heat-side integral time) Ti_Heat suitable for the calculation of the manipulated variable MV to be output to the heater and an integral time (cool-side integral time) Ti_Cool suitable for the calculation of the manipulated variable MV to be output to the cooler, the average integral time Ti_Ave may be simply used. As a derivative time (heat-side derivative time) Td_Heat suitable for the calculation of the manipulated variable MV to be output to the heater and a derivative time (cool-side derivative time) Td_Cool suitable for the calculation of the manipulated variable MV to be output to the cooler, the average derivative time Td_Ave may be simply used.

$$Ti\_Heat=Ti\_Ave \quad (21)$$

$$Ti\_Cool=Ti\_Ave \quad (22)$$

$$Td\_Heat=Td\_Ave \quad (23)$$

$$Td\_Cool=Td\_Ave \quad (24)$$

The arrangement of the heat/cool control apparatus according to this embodiment will be described on the basis of the above principle. FIG. 1 shows the arrangement of the heat/cool control apparatus according to the first embodiment of the present invention. The heat/cool control apparatus in FIG. 1 includes a set point input section 1 which inputs the set point SP set by the operator of the control apparatus, a controlled variable input section 2 which inputs the controlled variable PV detected by a sensor (not shown), a manipulated variable output section 3 which outputs the manipulated variable MV to a heater (not shown) serving as a heating actuator for implementing a heating function for temperature control or a cooler (not shown) serving as a cooling actuator for implementing a cooling function for temperature control, a PID control computation section 4 which calculates the manipulated variable MV by performing PID control computation for the deviation between the set point SP and the controlled variable PV on the basis of control parameters (PID parameters), a heat-side manipulated variable storage section 5 which stores a predetermined heat-side manipulated variable set point ATh (0<ATh≦100%) to be output to the heater at the time of execution of autotuning, and a cool-side manipulated variable storage section 6 which stores a predetermined cool-side manipulated variable set point ATc (−100<ATc≦0%) to be output to the cooler at the time of execution of autotuning.

The heat/cool control apparatus further includes a limit cycle autotuning computation section 7 which generates the first limit cycle in which the heat-side manipulated variable set point ATh and cool-side manipulated variable set point ATc are alternately output and the second limit cycle in which either the heat-side manipulated variable set point ATh or the cool-side manipulated variable set point ATc is changed, and detects the first control response corresponding to the first limit cycle and the second control response corresponding to the second limit cycle, a manipulated variable change ratio storage section 8 which stores predetermined change instruction information CI for instructing which one of the heat-side manipulated variable set point ATh and the cool-side manipulated variable set point ATc is to be changed after the first limit cycle, and a predetermined manipulated variable change ratio $\mu$ (0<$\mu$L<1) indicating the degree of this change, a two-step limit cycle computation section 9 which instructs the limit cycle autotuning computation section 7 to execute the first and second limit cycles, a first limit cycle information storage section 10 which stores the information of the first control response corresponding to the first limit cycle, a second limit cycle information storage section 11 which stores the information of the second control response corresponding to the second limit cycle, and a PID parameter calculation section 12 which calculates PID parameters for the heat and cool modes on the basis of the detected first and second control responses, and sets the calculated PID parameters in the PID control computation section 4.

The PID control computation section 4 implements a control computation means. The manipulated variable change ratio storage section 8 implements a manipulated variable change ratio storage means. The limit cycle autotuning computation section 7 and two-step limit cycle computation section 9 implement a limit cycle generating means and control response detection means, respectively. The PID parameter calculation section 12 implements a control parameter calculation means.

Figure 2:
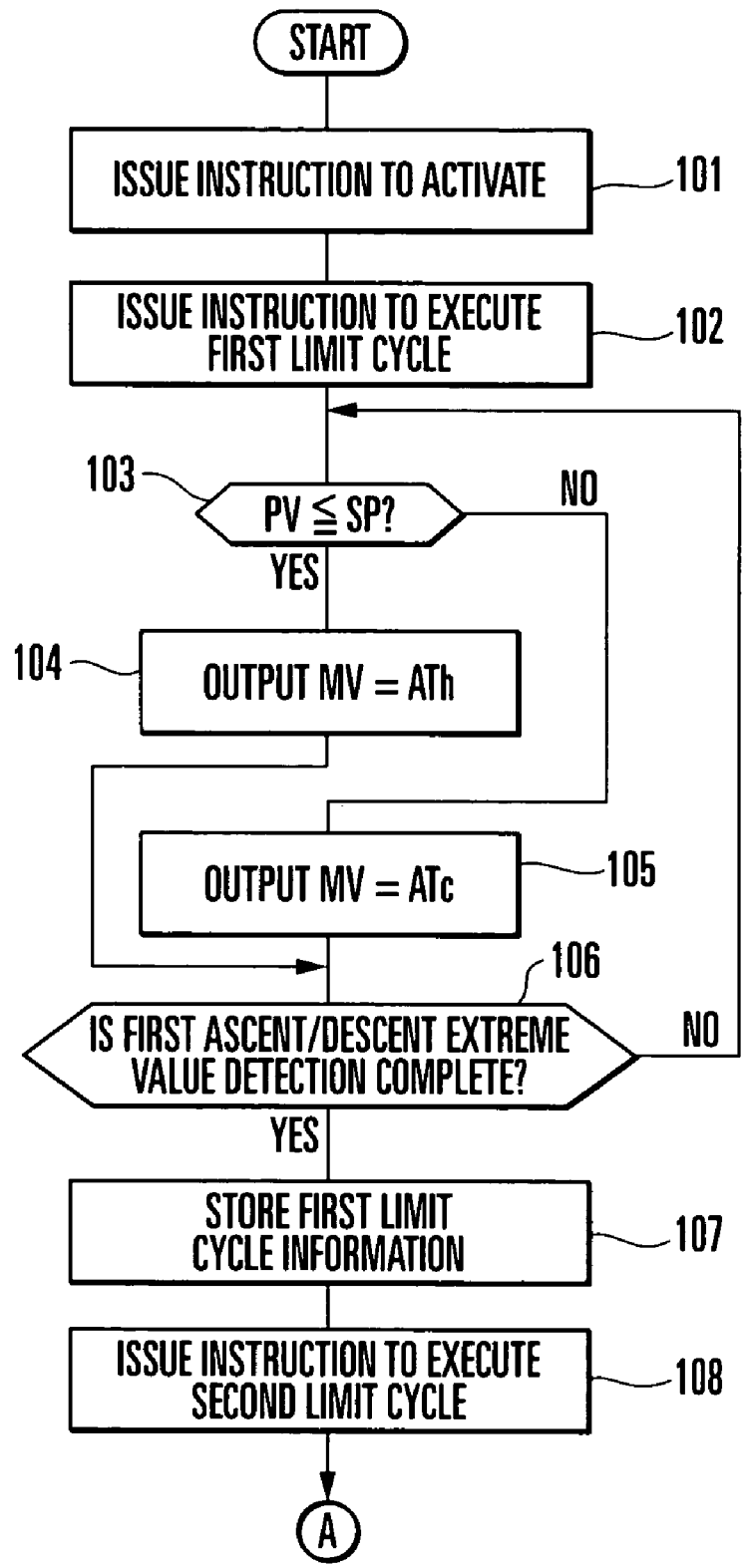
FIG. 2 is a flow chart showing the operation of the heat/cool control apparatus in FIG. 1 at the time of execution of limit cycle autotuning.
Figure 3:
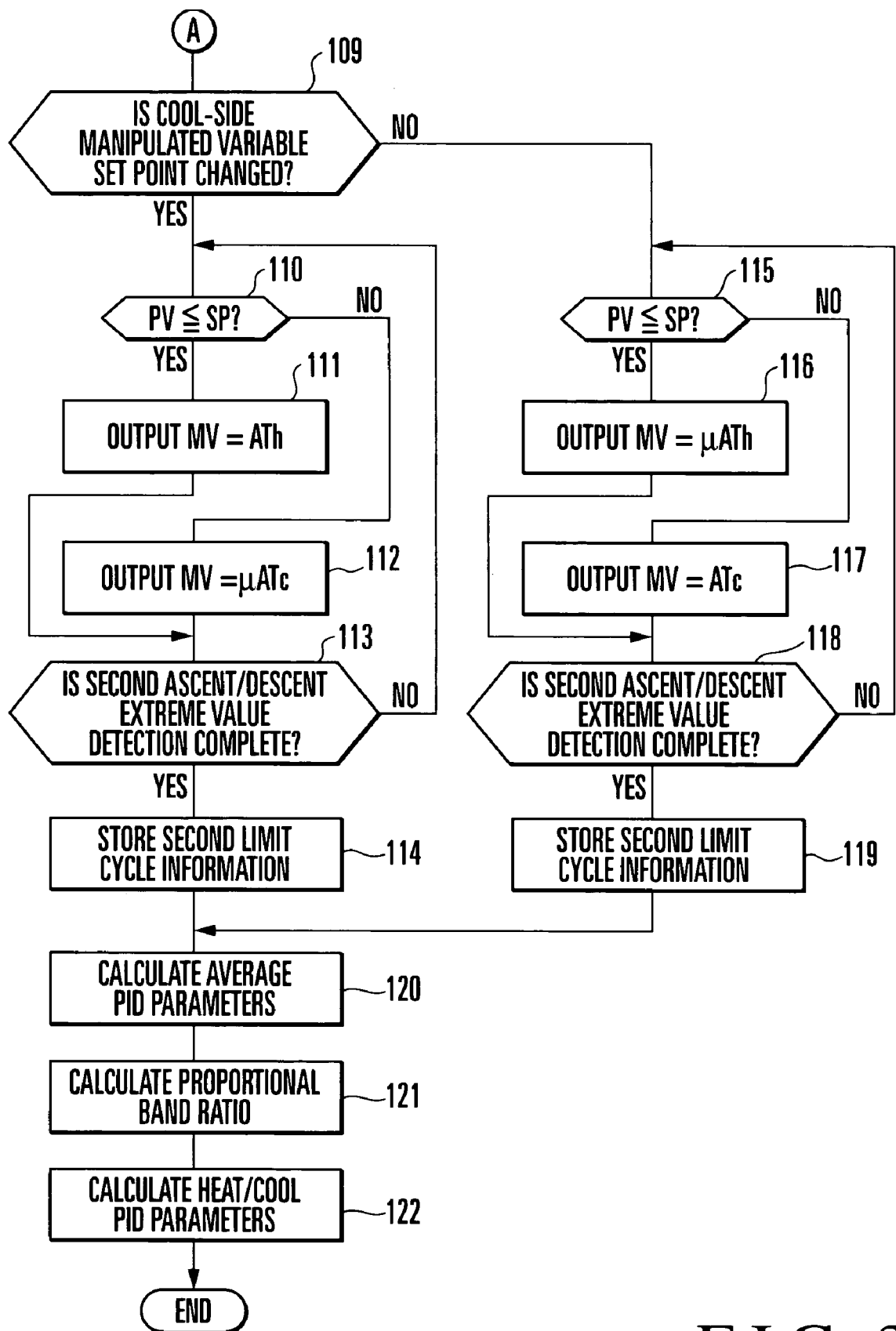
FIG. 3 is a flow chart showing the operation of the heat/cool control apparatus in FIG. 1 at the time of execution of limit cycle autotuning.

The operation of the heat/cool control apparatus in FIG. 1 will be described with reference to FIGS. 2 and 3. Referring to FIGS. 2 and 3, steps 102 to 105 show a sequence for generating the first limit cycle; steps 106 and 107, a sequence for detecting the first control response; steps 108 to 112 and 115 to 117, a sequence for generating the second limit cycle; steps 113, 114, 118, and 119, a sequence for detecting the second control response; and steps 120 to 122, a sequence for calculating control parameters.

The set point SP is set by the operator of the autotuning apparatus and input to the PID control computation section 4, limit cycle autotuning computation section 7, and two-step limit cycle computation section 9 through the set point input section 1. The controlled variable PV is detected by a sensor (not shown) and input to the PID control computation section 4, limit cycle autotuning computation section 7, and two-step limit cycle computation section 9 through the controlled variable input section 2.

When the operator issues an instruction to execute limit cycle autotuning, the two-step limit cycle computation section 9 is activated to start a series of operations (step 101 in FIG. 2). The activated two-step limit cycle computation section 9 instructs the limit cycle autotuning computation section 7 to execute the first limit cycle. In response to this instruction, the limit cycle autotuning computation section 7 reads out the heat-side manipulated variable set point ATh from the heat-side manipulated variable storage section 5, and the cool-side manipulated variable set point ATc from the cool-side manipulated variable storage section 6 (step 102).

The limit cycle autotuning computation section 7 compares the controlled variable PV with the set point SP at the time of execution of the first limit cycle (step 103). If the controlled variable PV is equal to or lower than the set point SP, the limit cycle autotuning computation section 7 outputs the heat-side manipulated variable set point ATh to the heater (not shown) through the manipulated variable output section 3 (step 104). If the controlled variable PV is higher than the set point SP, the limit cycle autotuning computation section 7 outputs the cool-side manipulated variable set point ATc to the cooler (not shown) through the manipulated variable output section 3 (step 105).

Figure 4:
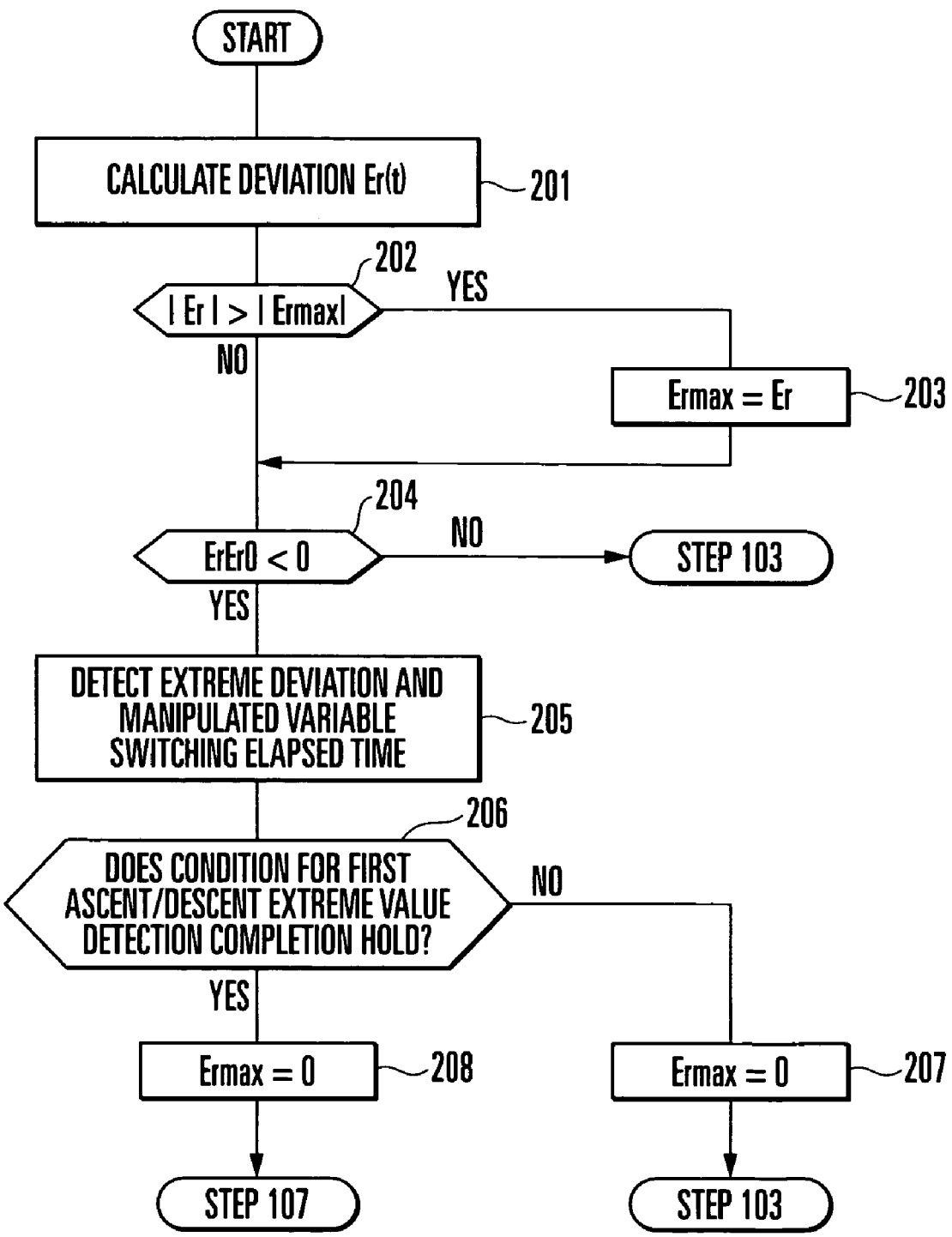
FIG. 4 is a flow chart showing the first ascent/descent extreme value detection processing by a limit cycle autotuning computation section in FIG. 1.
Figure 5:
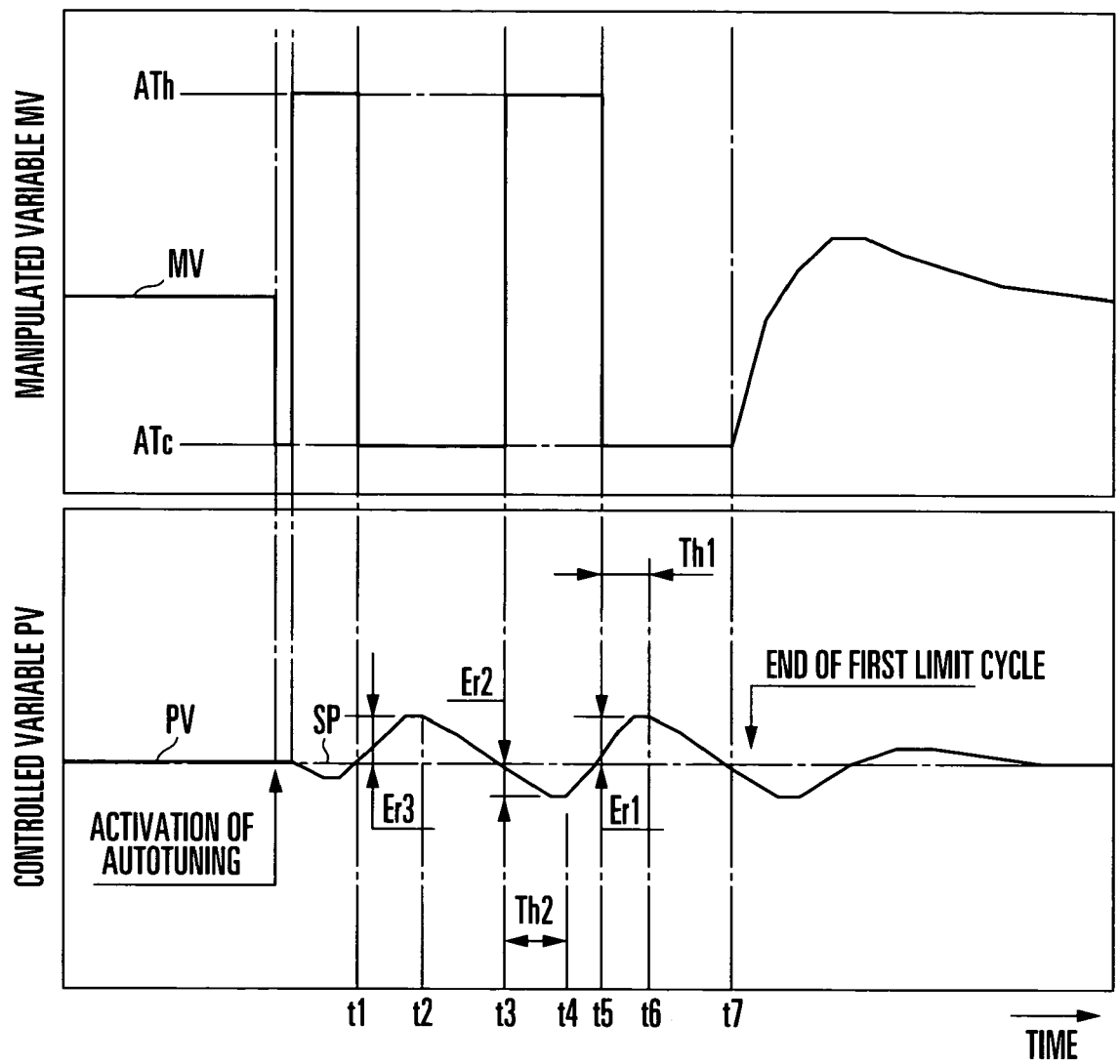
FIG. 5 is a timing chart for explaining the first ascent/descent extreme value detection processing.

The limit cycle autotuning computation section 7 then performs the first ascent/descent extreme value detection processing (step 106). FIG. 4 shows the first ascent/descent extreme value detection processing by the limit cycle autotuning computation section 7. FIG. 5 explains the first ascent/descent extreme value detection processing.

First of all, the limit cycle autotuning computation section 7 calculates a deviation Er in the current control period on the basis of the set point SP and controlled variable PV (step 201 in FIG. 4).

$$Er = SP - PV \quad (25)$$

Subsequently, the limit cycle autotuning computation section 7 determines whether or not the following inequality holds (step 202):

$$|Er| > |Ermax| \quad (26)$$

where Ermax is the maximum deviation whose initial value is 0. If inequality (26) holds, the limit cycle autotuning computation section 7 sets Ermax=Er, i.e., sets the deviation Er in the current control period to the maximum deviation Ermax (step 203).

The limit cycle autotuning computation section 7 then determines according to the following inequality whether or not the sign of the deviation Er has changed (step 204).

$$ErEr0 < 0 \quad (27)$$

where Er0 is a deviation one control period before the current one. Inequality (27) is used to determine that the sign of the deviation Er is reversed, when the product of the current deviation Er and the deviation Er0 one control period before the current one is negative. If inequality (27) does not hold, it is determined that ascent/descent extreme value detection is not complete, and the flow returns to step 103.

When the processing in steps 103 to 105 and 106 (steps 201 to 204) is repeated for every control period, the maximum deviation Ermax is updated with an increase in the deviation Er. At time t1 in FIG. 5, inequality (27) holds. When inequality (27) holds, the limit cycle autotuning computation section 7 sets Er1=Ermax, i.e., sets the maximum deviation Ermax to a first extreme deviation Er1. The limit cycle autotuning computation section 7 sets, as a first manipulated variable switching elapsed time Th1, the time interval from the time when inequality (27) has previously held to the latest time when the maximum deviation Ermax is updated (step 205). Note that when inequality (27) holds for the first time, the first manipulated variable switching elapsed time Th1 is set to 0.

The limit cycle autotuning computation section 7 determines whether or not the first ascent/descent extreme value detection completion condition has held (step 206). In this embodiment, assume that when four extreme values of the controlled variable PV are detected, the first ascent/descent extreme value detection completion condition holds. In this case, since only one extreme value of the controlled variable PV is detected, it is determined that the ascent/descent extreme value detection is not complete, the maximum deviation Ermax is initialized to 0 (step 207), and the flow returns to step 103.

When the processing in steps 103 to 106 is repeated for every control period, inequality (27) holds again at time t3 in FIG. 5. When inequality (27) holds, the limit cycle autotuning computation section 7 sets Er2=Er1, Er1=Ermax, and Th2=Th1, i.e., assigns the value of the first extreme deviation Er1 to the second extreme deviation Er2, sets the maximum deviation Ermax to the new first extreme deviation Er1, and assigns the value of the first manipulated variable switching elapsed time Th1 to the second manipulated variable switching elapsed time Th2. The limit cycle autotuning computation section 7 sets, as the new first manipulated variable switching elapsed time Th1, the time interval from time t1 when inequality (27) has previously held to latest time t2 when the maximum deviation Ermax is updated (step 205).

The limit cycle autotuning computation section 7 then determines whether or not the first ascent/descent extreme value detection completion condition has held (step 206). In this case, since only two extreme values of the controlled variable PV have been detected, it is determined that the ascent/descent extreme value detection is not complete, and the maximum deviation Ermax is initialized to 0 (step 207). The flow returns to step 103.

When the processing in steps 103 to 106 is repeated for every control period, inequality (27) holds again at time t5 in FIG. 5. When inequality (27) holds, the limit cycle autotuning computation section 7 sets Er3=Er2, Er2=Er1, Er1=Ermax, and Th2=Th1, i.e., assigns the value of the second extreme deviation Er2 to the third extreme deviation Er3, assigns the value of the first extreme deviation Er1 to the second extreme deviation Er2, sets the maximum deviation Ermax to the new first extreme deviation Er1, and assigns the value of the first manipulated variable switching elapsed time Th1 to the second manipulated variable switching elapsed time Th2. The limit cycle autotuning computation section 7 also sets, as the new first manipulated variable switching elapsed time Th1, the time interval from time t3 when inequality (27) has previously held to latest time t4 when the maximum deviation Ermax is updated (step 205).

The limit cycle autotuning computation section 7 then determines whether or not the first ascent/descent extreme value detection completion condition has held (step 206). In this case, since only three extreme values of the controlled variable PV have been detected, it is determined that the ascent/descent extreme value detection is not complete, and the maximum deviation Ermax is initialized to 0 (step 207). The flow returns to step 103.

When the processing in steps 103 to 106 is repeated for every control period, inequality (27) holds again at time t7 in FIG. 5. When inequality (27) holds, the limit cycle-autotuning computation section 7 sets Er3=Er2, Er2=Er1, Er1=Ermax, and Th2=Th1, and sets, as the new first manipulated variable switching elapsed time Th1, the time interval from time t5 when inequality (27) has previously held to latest time t6 when the maximum deviation Ermax is updated (step 205).

The limit cycle autotuning computation section 7 then determines whether or not the first ascent/descent extreme value detection completion condition has held (step 206). In this case, since four extreme values of the controlled variable PV have been detected, it is determined that the ascent/descent extreme value detection is complete, and the maximum deviation Ermax is initialized to 0 (step 208). The flow advances to step 107.

As is obvious from FIG. 5, although the number of extreme values of the controlled variable PV which are required to calculate PID parameters is basically three, since there is a possibility that the first extreme value may be an inappropriate value for parameter calculation, four extreme values of the controlled variable PV are detected.

Upon completion of the first ascent/descent extreme value detection processing, the limit cycle autotuning computation section 7 calculates the amplitude A1 of the controlled variable PV in the first limit cycle according to the following equation, and stores the resultant data in the first limit cycle information storage section 10 (step 107).

$$A1=|Er2-Er1| \qquad (28)$$

Figure 6:
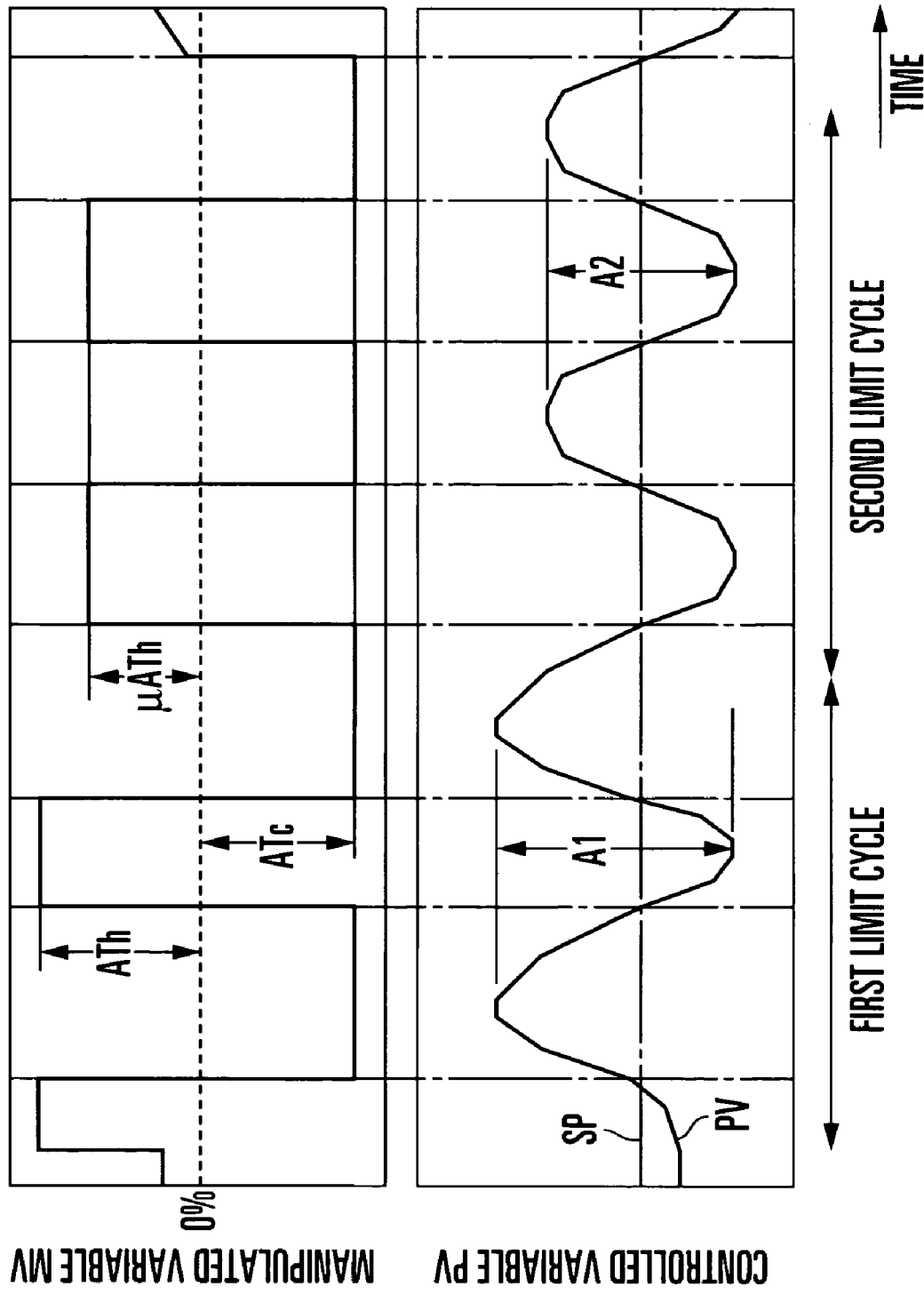
FIG. 6 is a timing chart for explaining controlled variable amplitude calculation processing.

FIG. 6 shows how the amplitude A1 is calculated. The first limit cycle is terminated in the above manner.

Subsequently, the two-step limit cycle computation section 9 instructs the limit cycle autotuning computation section 7 to execute the second limit cycle. In response to this instruction, the limit cycle autotuning computation section 7 reads out the heat-side manipulated variable set point ATh from the heat-side manipulated variable storage section 5, and also reads out the cool-side manipulated variable set point ATc from the cool-side manipulated variable storage section 6. In addition, the limit cycle autotuning computation section 7 reads out, from the manipulated variable change ratio storage section 8, the change instruction information CI for instructing which one of the heat-side manipulated variable set point ATh and the cool-side manipulated variable set point ATc is to be changed in the second limit cycle, and the manipulated variable change ratio $\mu$ (step 108 in FIG. 3).

If it is known from information on control apparatus design that there is a difference between the heating capacity on the heat side and the cooling capacity on the cool side, the change instruction information CI is set in advance before the execution of autotuning so as to decrease the manipulated variable set point on the side with higher capacity in order to correct this difference. If, therefore, the heating capacity on the heat side is higher, the change instruction information CI instructs to change the heat-side manipulated variable set point ATh to µATh. If the cooling capacity on the cool side is higher, the change instruction information CI instructs to change the cool-side manipulated variable set point ATc to µATc. The manipulated variable change ratio µ is set as a coefficient of about 0.6 to 0.8.

The limit cycle autotuning computation section 7 then determines on the basis of the change instruction information CI which one of the cool-side manipulated variable set point and the heat-side manipulated variable set point is to be changed (step 109). If the change instruction information CI instructs to change the cool-side manipulated variable set point ATc, the limit cycle autotuning computation section 7 compares the controlled variable PV with the set point SP (step 110). If the controlled variable PV is equal to or lower than the set point SP, the limit cycle autotuning computation section 7 outputs the heat-side manipulated variable set point ATh to the heater (step 111). If the controlled variable PV is higher than the set point SP, the limit cycle autotuning computation section 7 changes the cool-side manipulated variable set point to µATc and outputs it to the cooler (step 112).

The limit cycle autotuning computation section 7 then performs the second ascent/descent extreme value detection processing (step 113). The second ascent/descent extreme value detection processing is similar to the first ascent/descent extreme value detection processing described with reference to FIGS. 4 and 5. The second ascent/descent extreme value detection processing differs from the first ascent/descent extreme value detection processing only in the following point. Of four detected extreme values, a deviation in the latest extreme value is set as a fourth extreme deviation Er4 (corresponding to Er1 in FIG. 5); a deviation in the second newest extreme value, as a fifth extreme deviation Er5 (corresponding to Er2 in FIG. 5); a deviation in the third newest extreme value, as a sixth extreme deviation Er6 (corresponding to Er3 in FIG. 5); the time interval from 1.5 the time when the sign of the deviation Er is reversed immediately before the fourth extreme deviation Er4 to the time when the fourth extreme deviation Er4 is obtained, as a third manipulated variable switching elapsed time Th3 (corresponding to Th1 in FIG. 5); and the time interval from the time when the sign of the deviation Er is reversed immediately before the fifth extreme deviation Er5 to the time when the fifth extreme deviation Er5 is obtained, as a fourth manipulated variable switching elapsed time Th4 (corresponding to Th2 in FIG. 5).

Upon completion of the second ascent/descent extreme value detection processing, the limit cycle autotuning computation section 7 calculates the amplitude A2 of the controlled variable PV in the second limit cycle according to the following equation, and stores the resultant data in the second limit cycle information storage section 11 (step 114)

$$A2=|Er5-Er4| \tag{29}$$

The limit cycle autotuning computation section 7 also stores, in the second limit cycle information storage section 11, the manipulated variable switching elapsed time Th_Heat from the instant at which the manipulated variable MV is switched from the cool-side manipulated variable set point µATc to the heat-side manipulated variable set point ATh in the second limit cycle to the instant at which the controlled variable PV reaches the minimum value, and the manipulated variable switching elapsed time Th_Cool from the instant at which the manipulated variable MV is switched from the heat-side manipulated variable set point ATh to the cool-side manipulated variable set point µATc to the instant at which the controlled variable PV reaches the maximum value (step 114). If the fourth extreme deviation Er4 is negative (the controlled variable PV is the maximum value), the third manipulated variable switching elapsed time Th3 is Th_Cool, and the fourth manipulated variable switching elapsed time Th4 is Th_Heat. If the fourth extreme deviation Er4 is positive (the controlled variable PV is the minimum value), the third manipulated variable switching elapsed time Th3 is Th_Heat, and the fourth manipulated variable switching elapsed time Th4 is Th_Cool.

If it is determined in step 109 that the change instruction information CI instructs to change the heat-side manipulated variable set point ATh, the limit cycle autotuning computation section 7 compares the controlled variable PV with the set point SP (step 115). If the controlled variable PV is equal to or lower than the set point SP, the limit cycle autotuning computation section 7 changes the heat-side manipulated variable set point to µATh, and outputs it to the heater (step 116). If the controlled variable PV is higher than the set point SP, the limit cycle autotuning computation section 7 outputs the cool-side manipulated variable set point ATc to the cooler (step 117).

Subsequently, the limit cycle autotuning computation section 7 performs the second ascent/descent extreme value detection processing (step 118), and stores the amplitude A2 of the controlled variable PV in the second limit cycle, the manipulated variable switching elapsed time Th_Heat, and the manipulated variable switching elapsed time Th_Cool in the second limit cycle information storage section 11 (step 119). The processing in steps 118 and 119 is the same as that in steps 113 and 114. FIG. 6 shows how the amplitude A2 is calculated.

Upon completion of step 114 or step 119, the PID parameter calculation section 12 calculates average PID parameters on the basis of the amplitude A2 of the controlled variable PV, the manipulated variable switching elapsed time Th_Heat, and the manipulated variable switching elapsed time Th_Cool which are stored in the second limit cycle information storage section 11 (step 120).

That is, when the heat-side manipulated variable set point is changed to a ATh in the second limit cycle, the PID parameter calculation section 12 calculates the average proportional band Pb_Ave according to equation (15). When the cool-side manipulated variable set point is changed to µATc in the second limit cycle, the PID parameter calculation section 12 calculates the average proportional band Pb_Ave according to equation (16). When either the heat-side manipulated variable set point is changed to µATh or the cool-side manipulated variable set point is changed to µATc in the second limit cycle, the PID parameter calculation section 12 calculates the average integral time Ti_Ave according to equation (19), and calculates the average derivative time Td_Ave according to equation (20).

Subsequently, when the heat-side manipulated variable set point is changed to µATh in the second limit cycle, the PID parameter calculation section 12 calculates the proportional band ratio K according to equation (13). When the cool-side manipulated variable set point is changed to µATc in the second limit cycle, the PID parameter calculation section 12 calculates the proportional band ratio K according to equation (14) (step 121).

The PID parameter calculation section 12 calculates PID parameters including the proportional band Pb, integral time Ti, and derivative time Td on each of the heat side and the cool side (step 122). When either the heat-side manipulated variable set point is changed to μATh or the cool-side manipulated variable set point is changed to μATc in the second limit cycle, the PID parameter calculation section 12 calculates the heat-side proportional band Pb_Heat, heat-side integral time Ti_Heat, and heat-side derivative time Td_Heat according to equations (17), (21), and (23), respectively, and calculates the cool-side proportional band Pb_Cool, cool-side integral time Ti_Cool, and cool-side derivative time Td_Cool according to equations (18), (22), and (24), respectively.

Finally, the PID parameter calculation section 12 sets the calculated heat-side proportional band Pb_Heat, heat-side integral time Ti_Heat, heat-side derivative time Td_Heat, cool-side proportional band Pb_Cool, cool-side integral time Ti_Cool, and cool-side derivative time Td_Cool in the PID control computation section 4 (step 122). With the above operation, the PID parameter calculation processing is complete, and limit cycle autotuning is terminated.

In normal control operation after limit cycle autotuning, the PID control computation section 4 performs PID control computation to calculate the manipulated variable MV for every control period on the basis of the set point SP input from the set point input section 1 and the controlled variable PV input from the controlled variable input section 2. At this time, if the manipulated variable MV one control period before the current one is equal to or higher than a predetermined value (e.g., 0%), the PID control computation section 4 determines the heat mode, and calculates the manipulated variable MV to make the controlled variable PV agree with the set point SP according to the following equation. The PID control computation section 4 outputs the calculated manipulated variable MV to the heater through the manipulated variable output section 3.

$$MV=(\zeta/Pb\_Heat)\{1+(1/Ti\_Heats)+Td\_Heats\}(SP-PV) \quad (30)$$

where s is a Laplace operator, and the constant ζ is, for example, 100.

If the manipulated variable MV one control period before the current one is less than the predetermined value, the PID control computation section 4 determines the cool mode, and calculates the manipulated variable MV according to the following equation. The PID control computation section 4 outputs the calculated manipulated variable MV to the cooler through the manipulated variable output section 3.

$$MV=(\zeta/Pb\_Cool)\{1+(1/Ti\_Cools)+Td\_Cools\}(SP-PV) \quad (31)$$

As described above, according to this embodiment, at the time of execution of limit cycle autotuning, the first limit cycle in which the predetermined heat-side manipulated variable set point ATh and the predetermined cool-side manipulated variable set point ATc are alternately output is generated to detect the first control response corresponding to the first limit cycle, and the second limit cycle in which either the heat-side manipulated variable set point ATh or the cool-side manipulated variable set point ATc is changed on the basis of the predetermined change instruction information CI and manipulated variable change ratio μ is generated to detect the second control response corresponding to the second limit cycle. Control parameters (PID parameters) are then calculated on the basis of the first and second control responses. Even if, therefore, no limit cycle can be generated by a heating actuator or cooling actuator alone, control parameters suitable for the heat and cool modes can be obtained.

In this embodiment, the first amplitude of the controlled variable is detected as the first control response, and the second amplitude of the controlled variable, a heat-side elapsed time, and a cool-side elapsed time are detected are detected as the second control response. The ratio between the heat-side process gain and the cool-side process gain is obtained on the basis of the first and second amplitudes, and a proportion band in each of the heat mode and the cool mode is calculated from this ratio. Integral and derivative times common to the heat and cool modes are then calculated from the average of the heat-side elapsed time and cool-side elapsed time. This makes it possible to easily obtain control parameters including a proportional band, integral time, and derivative time. In addition, using the average of a heat-side elapsed time and cool-side elapsed time for the calculation of an integral time and derivative time can prevent the occurrence of discontinuous control operation when the heat mode is switched to the cool mode or the cool mode is switched to the heat mode in normal control operation after the completion of autotuning.

Second Embodiment

The second embodiment of the present invention will be described next. The principle of this embodiment will be described first. In the first embodiment, the change instruction information CI for instructing to change either the heat-side manipulated variable set point ATh or the cool-side manipulated variable set point ATc in the second limit cycle and the manipulated variable change ratio μ are set in advance. It is difficult for the operator who has no expert knowledge about control to make such settings. This embodiment therefore provides an arrangement for making a heat/cool control apparatus automatically determine change instruction information CI and a manipulated variable change ratio μ.

In an automatic determination method, a heat-side maximum deviation Erh (Erh<0) and a cool-side maximum deviation Erc (Erc>0) which are caused in the first limit cycle are detected. The ratio between the maximum deviations Erh and Erc reflects the balance between the heating capacity on the heat side and the cooling capacity on the cool side, and hence the change instruction information CI and manipulated variable change ratio μ may be automatically determined on the basis of this ratio.

More specifically, if |Erc|≧|Erh| holds, the manipulated variable change ratio μ may be calculated according to the following equation to generate the change instruction information CI for instructing to change the cool-side manipulated variable set point ATc.

$$\mu=|Erh/Erc| \quad (32)$$

If |Erh|<|Erc| holds, the manipulated variable change ratio μ may be calculated according to the following equation to generate the change instruction information CI for instructing to change the heat-side manipulated variable set point ATh.

$$\mu=|Erc/Erh| \quad (33)$$

Figure 7:
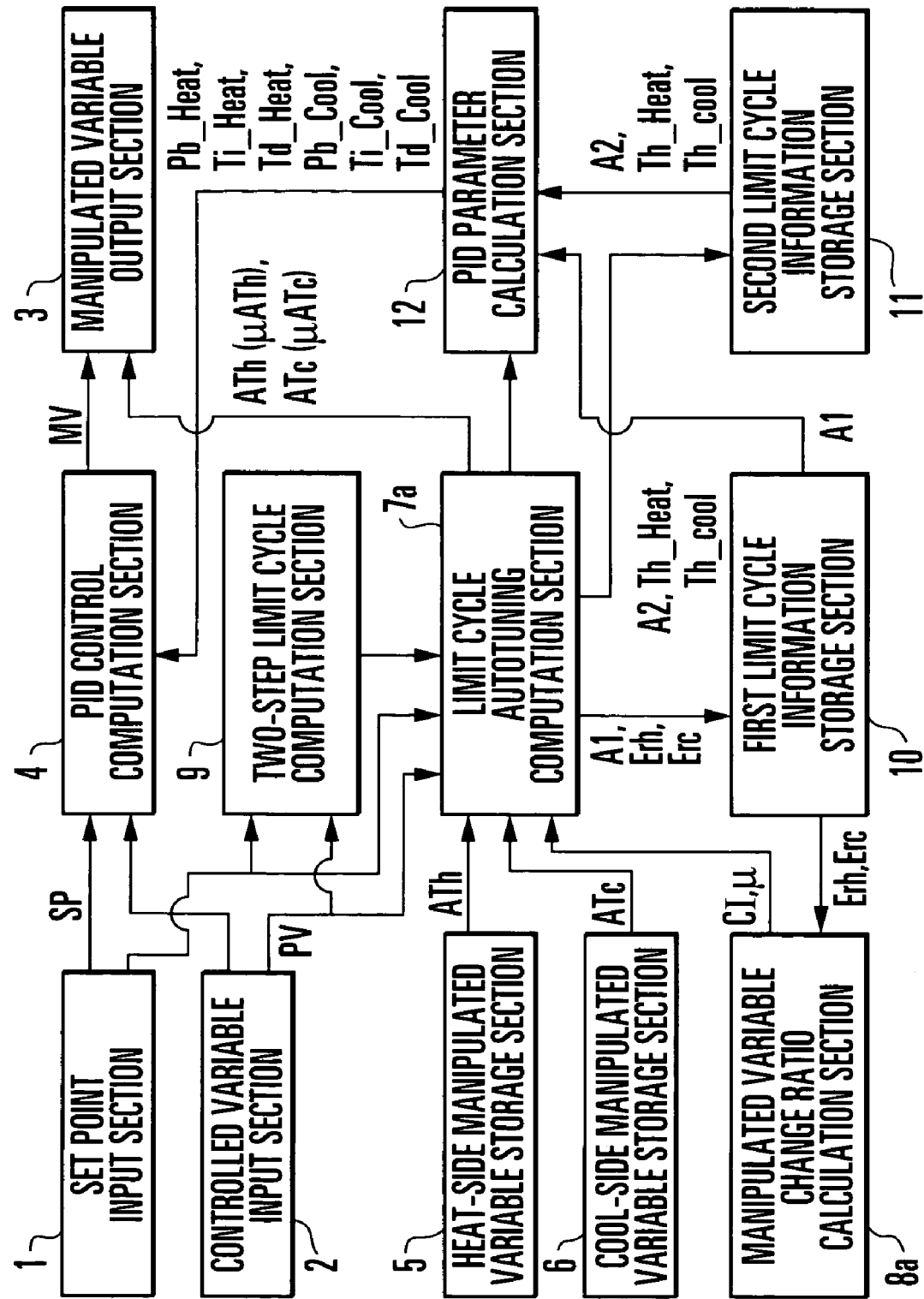
FIG. 7 is a block diagram showing the arrangement of a heat/cool control apparatus according to the second embodiment of the present invention.

The arrangement of the heat/cool control apparatus according to this embodiment will be described on the basis of the above principle. FIG. 7 shows the arrangement of the heat/cool control apparatus according to the second embodiment of the present invention. The same reference numerals as in FIG. 1 denote the same parts in FIG. 7. A limit cycle autotuning computation section 7a has the same function as that of the limit cycle autotuning computation section 7 in FIG. 1, and also has a function of storing the heat-side maximum deviation Erh and cool-side maximum deviation Erc in a first limit cycle information storage section 10 after the first limit cycle. In place of the manipulated variable change ratio storage section 8 in FIG. 1, this embodiment also has an manipulated variable change ratio calculation section 8a which determines the change instruction information CI and manipulated variable change ratio $\mu$ on the basis of the first response corresponding to the first limit cycle. The manipulated variable change ratio calculation section 8a implements a manipulated variable change ratio calculation means.

The operation of the heat/cool control apparatus in FIG. 7 will be described next with reference to FIG. 8. Steps 102 to 105 in FIG. 8 show a sequence for generating the first limit cycle; steps 106 and 107a, a sequence for detecting the first control response; step 123, a sequence for calculating a manipulated variable change ratio; step 108a and steps 109 to 112, and steps 115 to 117 in FIG. 3, a sequence for generating the second limit cycle; steps 113, 114, 118, and 119, a sequence for detecting the second control response; and steps 120 to 122, a sequence for calculating control parameters.

Figure 8:
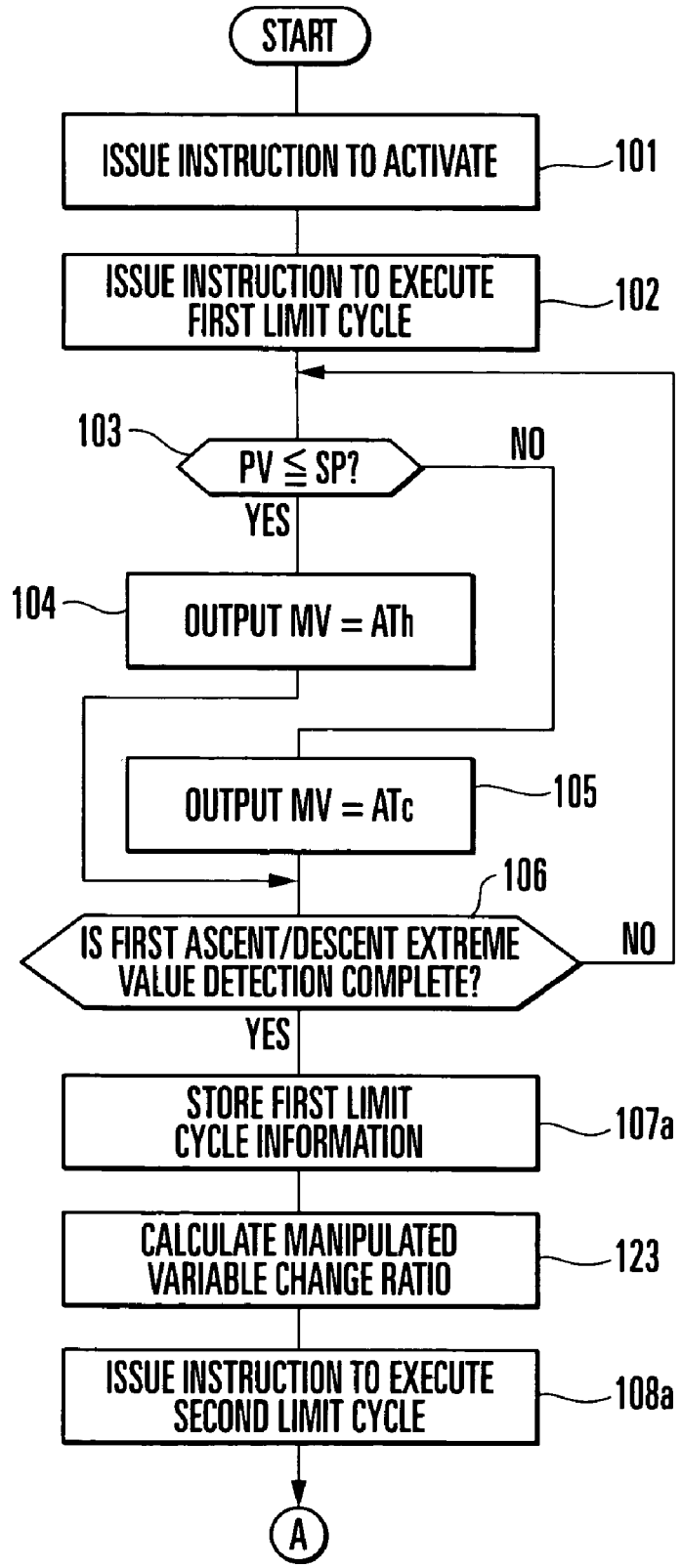
FIG. 8 is a flow chart showing the operation of the heat/cool control apparatus in FIG. 7 at the time of execution of a limit cycle autotuning.
Figure 9:
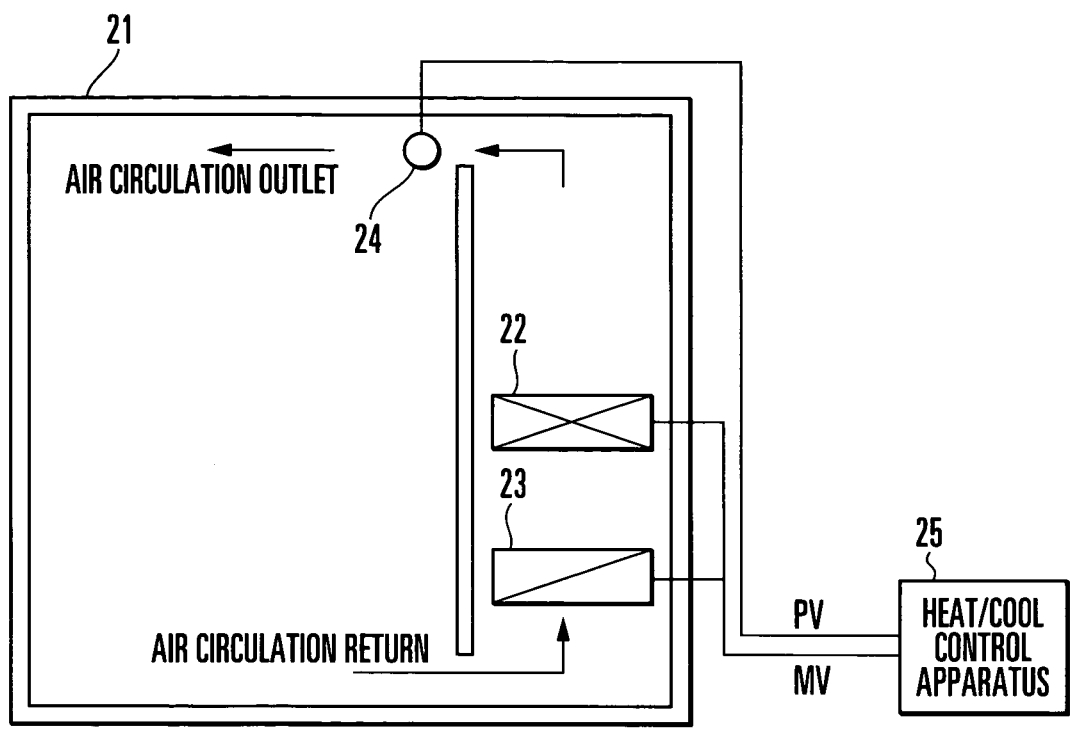
FIG. 9 is a block diagram showing the arrangement of a conventional heat/cool control system.
Figure 10:
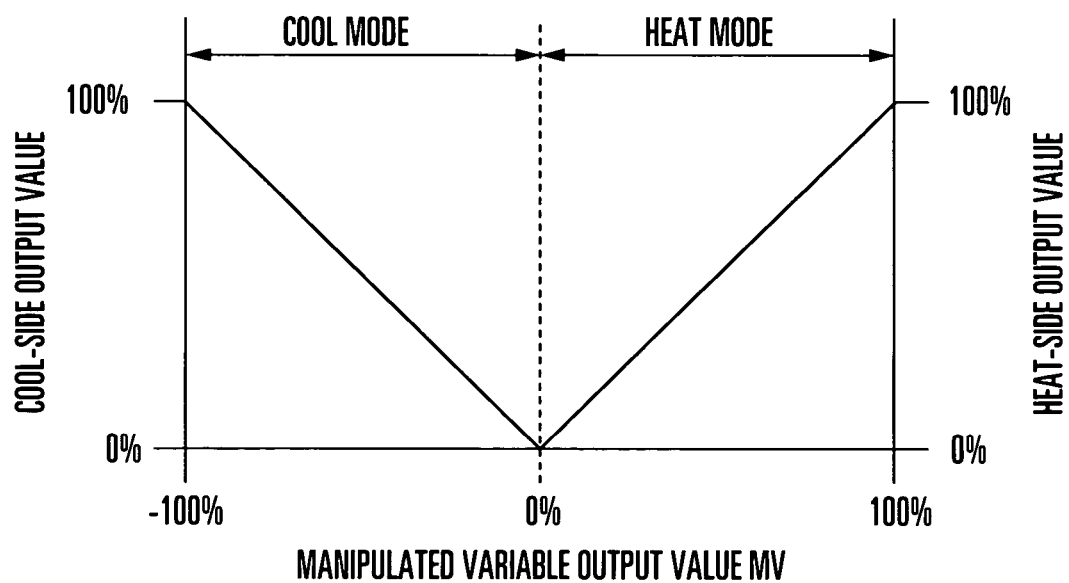
FIG. 10 is a graph for explaining manipulated variable outputs in heat/cool control.

When the operator issues an instruction to execute limit cycle autotuning, a two-step limit cycle computation section 9 is activated to start a series of operations (step 101 in FIG. 8). The processing in steps 102 to 106 is the same as that in the first embodiment.

After the completion of the first ascent/descent extreme value detection processing, the limit cycle autotuning computation section 7a calculates an amplitude A1 of a controlled variable PV in the first limit cycle according to equation (28), and stores the resultant data in the first limit cycle information storage section 10. The limit cycle autotuning computation section 7a also stores the heat-side maximum deviation Erh and cool-side maximum deviation Erc in the first limit cycle in the first limit cycle information storage section 10 (step 107a). If a first extreme deviation Er1 is negative (the controlled variable PV is the maximum value), the first extreme deviation Er1 is Erh, and the second extreme deviation Er2 is Erc. If the first extreme deviation Er1 is positive (the controlled variable PV is the minimum value), the first extreme deviation Er1 is Erc, and the second extreme deviation Er2 is Erh.

The manipulated variable change ratio calculation section 8a compares the heat-side maximum deviation Erh and cool-side maximum deviation Erc stored in the first limit cycle information storage section 10. If |Erc|≧|Erh| holds, the manipulated variable change ratio calculation section 8a calculates the manipulated variable change ratio $\mu$ according to equation (32) to generate the change instruction information CI for instructing to change the cool-side manipulated variable set point ATc. If |Erc|<|Erh| holds, the manipulated variable change ratio calculation section 8a calculates the manipulated variable change ratio $\mu$ according to equation (33) to generate the change instruction information CI for instructing to change the heat-side manipulated variable set point ATh (step 123). The manipulated variable change ratio calculation section 8a then stores the calculated manipulated variable change ratio $\mu$ and the generated change instruction information CI.

After the completion of the processing in step 123, the two-step limit cycle computation section 9 instructs the limit cycle autotuning computation section 7a to execute the second limit cycle. In response to this instruction, the limit cycle autotuning computation section 7a reads out the heat-side manipulated variable set point ATh from a heat-side manipulated variable storage section 5 and the cool-side manipulated variable set point ATc from a cool-side manipulated variable storage section 6. The limit cycle autotuning computation section 7a further reads out the change instruction information CI and manipulated variable change ratio $\mu$ from the manipulated variable change ratio calculation section 8a (step 108a).

Since the processing in steps 109 to 122 is the same as that in the first embodiment, an illustration and description thereof will be omitted.

As described above, according to this embodiment, the change instruction information CI and manipulated variable change ratio $\mu$ can be automatically determined on the basis of the first control response. As a consequence, according to this embodiment, the same effect as that of the first embodiment can be obtained. In addition, since there is no need to set the change instruction information CI and manipulated variable change ratio $\mu$ in advance, a heat/cool control apparatus can be realized, which allows even an operator who has no expert knowledge about control to easily use.

In addition, in this embodiment, by detecting a heat-side maximum deviation and cool-side maximum deviation as the first control response, change instruction information and a manipulated variable change ratio can be easily determined on the basis of the heat-side maximum deviation and cool-side maximum deviation. In addition, in the control parameter calculation sequence, calculating heat-mode integral and derivative times from a heat-side elapsed time, and cool-mode integral and derivative times from a cool-side elapsed time makes it possible to obtain more preferable integral and derivative times for each of the heat mode and the cool mode, thereby obtaining better control characteristics.

Third Embodiment

The third embodiment of the present invention will be described next. The principle of this embodiment will be described first. In the second embodiment, the manipulated variable change ratio $\mu$ is automatically determined. According to this automatic determination method, since the difference between the heat-side maximum deviation Erh and the cool-side maximum deviation Erc in the second limit cycle becomes smaller than the first limit cycle, more ideal autotuning can be realized.

In the first and second embodiments, the average integral time Ti_Ave and average derivative time Td_Ave are used as the integral time Ti and derivative time Td common to the heat side and cool side on the basis of the premise that the integral time Ti and derivative time Td as PID parameters remain unchanged both in the heat mode and the cool mode. The adjustment method based on the average integral time Ti_Ave and average derivative time Td_Ave has a merit that when the heat mode is switched to the cool mode or the cool mode is switched to the heat mode in normal control operation after autotuning, the manipulated variable change is small and no discontinuous control operation occurs.

Depending on the characteristics of a control target, however, the integral time Ti and derivative time Td may be preferably set to different values in the heat mode and cool mode. This embodiment provides a heat/cool control apparatus which can obtain better control characteristics by obtaining the integral time Ti and derivative time Td suitable for the heat mode and cool mode, respectively.

If a manipulated variable change ratio $\mu$ is automatically determined as in the second embodiment, a response waveform ideal for autotuning appears in the second limit cycle. In this case, a manipulated variable switching elapsed time Th_Cool from the instant at which a manipulated variable MV is switched from a heat-side manipulated variable set point μATh (or ATh) to a cool-side manipulated variable set point ATc (or μATc) to the instant at which a controlled variable PV reaches the maximum value is almost equal to a cool-side process dead time Lp_Cool set when the cool-side manipulated variable set point ATc (μATc) is output. In addition, a manipulated variable switching elapsed time Th_Heat from the instant at which the manipulated variable MV is switched from a cool-side manipulated variable set point ATc (μATh) to a heat-side manipulated variable set point μATh (or ATh) to the instant at which the controlled variable PV reaches the minimum value is almost equal to a heat-side process dead time Lp_Heat set when the heat-side manipulated variable set point ATh (μATh) is output.

On the basis of the manipulated variable switching elapsed times Th_Heat and Th_Cool and equations (8) and (9), therefore, a heat-side integral time Ti_Heat, cool-side integral time Ti_Cool, heat-side derivative time Td_Heat, and cool-side derivative time Td_Cool can be calculated as follows:

$$Ti\_Heat = \beta Lp\_Heat = \beta Th\_Heat \quad (34)$$

$$Ti\_Cool = \beta Lp\_Cool = \beta Th\_Cool \quad (35)$$

$$Td\_Heat = \gamma Lp\_Heat = \gamma Th\_Heat \quad (36)$$

$$Td\_Cool = \gamma Lp\_Cool = \gamma Th\_Cool \quad (37)$$

The arrangement and operation of the heat/cool control apparatus of this embodiment are almost the same as those of the second embodiment, and differ only in the following points. First, there is no need to calculate the average integral time Ti_Ave and average derivative time Td_Ave in step 120 in FIG. 3. Second, when calculating PID parameters in step 122, a PID parameter calculation section 12 calculates the heat-side integral time Ti_Heat and heat-side derivative time Td_Heat according to equations (34) and (36), respectively, and calculates the cool-side integral time Ti_Cool and cool-side derivative time Td_Cool according to equations (35) and (37), respectively.

As has been described above, according to this embodiment, more preferable integral time Ti and derivative time Td can be obtained in each of the heat mode and the cool mode. As a consequence, in this embodiment, the same effect as that in the second embodiment can be obtained, and control characteristics better than those in the first and second embodiments can be obtained.

What is claimed is:

1. A limit cycle autotuning method of calculating a control parameter by alternately performing operation of outputting a predetermined heat-side manipulated variable set point to a heating actuator and operation of outputting a predetermined cool-side manipulated variable set point to a cooling actuator in a heat/cool control apparatus which performs temperature control by performing feedback control computation with respect to a deviation between a set point and a controlled variable on the basis of the control parameter, and properly switching a heat mode of outputting a manipulated variable to the heating actuator and a cool mode of outputting a manipulated variable to a cooling actuator, comprising:

the first limit cycle generation step of generating a first limit cycle of alternately outputting the heat-side manipulated variable set point and the cool-side manipulated variable set point;

the first control response detection step of detecting a first control response corresponding to the first limit cycle;

the second limit cycle generation step of generating a second limit cycle by changing one of the heat-side manipulated variable set point and the cool-side manipulated variable set point on the basis of predetermined change instruction information for instructing which one of the heat-side manipulated variable set point and the cool-side manipulated variable set point is to be changed after the first limit cycle and a predetermined manipulated variable change ratio indicating a degree of the change;

the second control response detection step of detecting a second control response corresponding to the second limit cycle; and the control parameter calculation step of calculating the control parameter for each of the heat mode and the cool mode on the basis of the detected first and second control responses.

2. A limit cycle autotuning method of calculating a control parameter by alternately performing operation of outputting a predetermined heat-side manipulated variable set point to a heating actuator and operation of outputting a predetermined cool-side manipulated variable set point to a cooling actuator in a heat/cool control apparatus which performs temperature control by performing feedback control computation with respect to a deviation between a set point and a controlled variable on the basis of the control parameter, and properly switching a heat mode of outputting a manipulated variable to the heating actuator and a cool mode of outputting a manipulated variable to a cooling actuator, comprising:

the first limit cycle generation step of generating a first limit cycle of alternately outputting the heat-side manipulated variable set point and the cool-side manipulated variable set point;

the first control response detection step of detecting a first control response corresponding to the first limit cycle;

the manipulated variable change ratio calculation step of determining, on the basis of the first control response, change instruction information for instructing which one of the heat-side manipulated variable set point and the cool-side manipulated variable set point is to be changed after the first limit cycle and a manipulated variable change ratio indicating a degree of the change;

the second limit cycle generation step of generating a second limit cycle by changing one of the heat-side manipulated variable set point and the cool-side manipulated variable set point on the basis of the change instruction information and the manipulated variable change ratio;

the second control response detection step of detecting a second control response corresponding to the second limit cycle; and the control parameter calculation step of calculating the control parameter for each of the heat mode and the cool mode on the basis of the detected first and second control responses.

3. A method according to claim 1, wherein the feedback control computation includes PID control computation based on the control parameter including a proportional band, an integral time, and a derivative time, in the first control response detection step, a first amplitude of a controlled variable is detected as the first control response, in the second control response detection step, a second amplitude of a controlled variable, a heat-side elapsed time from the instant at which output of a manipulated variable set point is switched to a heat side to the instant at which the controlled variable reaches a minimum value, and a cool-side elapsed time from the instant at which output of a manipulated variable set point is switched to a cool side to the instant at which the controlled variable reaches a maximum value are detected as the second control response, and in the control parameter calculation step, a ratio between a heat-side process gain and a cool-side process gain is obtained on the basis of the first and second amplitudes, the proportional band is calculated for each of the heat mode and the cool mode from the ratio, and the integral and derivative times common to the heat mode and the cool mode are calculated from an average of the heat-side elapsed time and the cool-side elapsed time.

4. A method according to claim 2, wherein
the feedback control computation includes PID control computation based on the control parameter including a proportional band, an integral time, and a derivative time, in the first control response detection step, a first amplitude of a controlled variable, a heat-side maximum deviation set when the controlled variable reaches a maximum value, and a cool-side maximum deviation set when the controlled variable reaches a minimum value are detected as the first control response, in the second control response detection step, a second amplitude of a controlled variable, a heat-side elapsed time from the instant at which output of a manipulated variable set point is switched to a heat side to the instant at which the controlled variable reaches a minimum value, and a cool-side elapsed time from the instant at which output of a manipulated variable set point is switched to a cool side to the instant at which the controlled variable reaches a maximum value are detected as the second control response, in the manipulated variable change ratio calculation step, the change instruction information and the manipulated variable change ratio are determined on the basis of the heat-side maximum deviation and the cool-side maximum deviation, and in the control parameter calculation step, a ratio between a heat-side process gain and a cool-side process gain is obtained on the basis of the first and second amplitudes, the proportional band is calculated for each of the heat mode and the cool mode from the ratio, the integral and derivative times in the heat mode are calculated from the heat-side elapsed time, and the integral and derivative times in the cool mode are calculated from the cool-side elapsed time.

5. A heat/cool control apparatus which has a limit cycle autotuning function of calculating a control parameter by alternately performing operation of outputting a predetermined heat-side manipulated variable set point to a heating actuator and operation of outputting a predetermined cool-side manipulated variable set point to a cooling actuator, and performs temperature control in normal operation by properly switching a heat mode of outputting a manipulated variable to the heating actuator and a cool mode of outputting a manipulated variable to the cooling actuator, comprising:

control computation means for calculating a manipulated variable to the heating actuator or the cooling actuator by performing feedback control computation with respect to a deviation between a set point and a controlled variable on the basis of the control parameter in the normal operation;

manipulated variable change ratio storage means for storing in advance change instruction information for instructing which one of the heat-side manipulated variable set point and the cool-side manipulated variable set point is to be changed during the autotuning, and a manipulated variable change ratio indicating a degree of the change;

limit cycle generating means for generating a second limit cycle, during execution of the autotuning, by changing one of the heat-side manipulated variable set point and the cool-side manipulated variable set point on the basis of the change instruction information and the manipulated variable change ratio after generating a first limit cycle of alternately outputting the heat-side manipulated variable set point and the cool-side manipulated variable set point;

control response detection means for detecting a first control response corresponding to the first limit cycle and a second control response corresponding to the second limit cycle; and control parameter calculation means for calculating the control parameter for each of the heat mode and the cool mode on the basis of the detected first and second control responses, and setting the calculated control parameters in said control computation means.

6. An apparatus according to claim 5, comprising manipulated variable change ratio calculation means for determining the change instruction information and the manipulated variable change ratio on the basis of the first control response, in place of said manipulated variable change ratio storage means.

7. An apparatus according to claim 5, wherein
said control computation means performs PID control computation on the basis of the control parameter including a proportional band, an integral time, and a derivative time, said control response detection means detects a first amplitude of a controlled variable as the first control response, and detects a second amplitude of a controlled variable, a heat-side elapsed time from the instant at which output of a manipulated variable set point is switched to a heat side to the instant at which the controlled variable reaches a minimum value, and a cool-side elapsed time from the instant at which output of a manipulated variable set point is switched to a cool side to the instant at which the controlled variable reaches a maximum value as the second control response, and said control parameter calculation means obtains a ratio between a heat-side process gain and a cool-side process gain on the basis of the first and second amplitudes, calculates the proportional band for each of the heat mode and the cool mode from the ratio, and calculates the integral and derivative times common to the heat mode and the cool mode from an average of the heat-side elapsed time and the cool-side elapsed time.

8. An apparatus according to claim 6, wherein
said control computation means performs PID control computation on the basis of the control parameter including a proportional band, an integral time, and a derivative time, said control response detection means detects a first amplitude of a controlled variable, a heat-side maximum deviation set when a controlled variable reaches a maximum value, and a cool-side maximum deviation set when a controlled variable reaches a minimum value as the first control response, and detects a second amplitude of a controlled variable, a heat-side elapsed time from the instant at which output of a manipulated variable set point is switched to a heat side to the instant at which the controlled variable reaches a minimum value, and a cool-side elapsed time from the instant at which output of a manipulated variable set point is switched to a cool side to the instant at which the controlled variable reaches a maximum value as the second control response, said manipulated variable change ratio calculation means determines the change instruction information and the manipulated variable change ratio on the basis of the heat-side maximum deviation and the cool-side maximum deviation, and said control parameter calculation means obtains a ratio between a heat-side process gain and a cool-side process gain on the basis of the first and second amplitudes, calculates the proportional band for each of the heat mode and the cool mode from the ratio, calculates the integral and derivative times in the heat mode from the heat-side elapsed time, and calculates the integral and derivative times in the cool mode from the cool-side elapsed time.

* * * * *